United States Patent
Schaefer et al.

(10) Patent No.: US 9,961,883 B2
(45) Date of Patent: May 8, 2018

(54) RAPID AND AUTOMATIC DETERMINATION OF METABOLIC EFFICIENCY IN LIVESTOCK

(71) Applicants: Allan Schaefer, Lacombe (CA); Kim Ominski, Winnipeg (CA); Sean Thompson, Winnipeg (CA)

(72) Inventors: Allan Schaefer, Lacombe (CA); Kim Ominski, Winnipeg (CA); Sean Thompson, Winnipeg (CA)

( * ) Notice: Subject to any disclaimer, the term of this patent is extended or adjusted under 35 U.S.C. 154(b) by 0 days. days.

(21) Appl. No.: 14/306,005

(22) Filed: Jun. 16, 2014

(65) Prior Publication Data

US 2015/0359199 A1 Dec. 17, 2015

(51) Int. Cl.
  G06K 9/00 (2006.01)
  A01K 29/00 (2006.01)

(52) U.S. Cl.
  CPC .................. A01K 29/005 (2013.01)

(58) Field of Classification Search
  None
  See application file for complete search history.

(56) References Cited

U.S. PATENT DOCUMENTS

| | | | | |
|---|---|---|---|---|
| 3,948,249 A | * | 4/1976 | Ambrosini | A61D 17/002 600/474 |
| 5,458,418 A | * | 10/1995 | Jones | A01K 29/00 374/124 |
| 5,474,085 A | * | 12/1995 | Hurnik | A01K 11/006 119/174 |
| 5,595,444 A | * | 1/1997 | Tong | A01K 29/00 374/124 |
| 5,740,809 A | * | 4/1998 | Baratta | A61B 5/01 374/130 |
| 6,123,451 A | * | 9/2000 | Schaefer | A22B 5/007 374/124 |
| 6,375,612 B1 | | 4/2002 | Guichon et al. | |
| 6,516,746 B2 | * | 2/2003 | Pratt | A01K 1/0023 119/51.02 |
| 6,974,373 B2 | * | 12/2005 | Kriesel | A01K 11/008 452/157 |

(Continued)

FOREIGN PATENT DOCUMENTS

CA 2234953 A1 4/1997
CA 2525676 A1 12/2004

(Continued)

OTHER PUBLICATIONS

Berry et al. "Daily variation in the udder surface temperature of dairy cows measured by infrared thermography: Potential for mastitis detection", Canadian Journal of Animal Science, 2003, 83(4):687-693.

(Continued)

Primary Examiner — Manuchehr Rahmjoo
(74) Attorney, Agent, or Firm — Marsh Fischmann & Breyfogle LLP; Jonathon A. Szumny

(57) ABSTRACT

Apparatus and methodologies for inducing a non-steady state in an animal to determine the metabolic efficiency of the animal. According to at least some embodiments herein, apparatus and methodologies for non-invasive, rapid infrared thermography of animals induced into non-steady biological states can be used to determine the animals' metabolic efficiency.

21 Claims, 4 Drawing Sheets

(56) References Cited

U.S. PATENT DOCUMENTS

Figure 1:
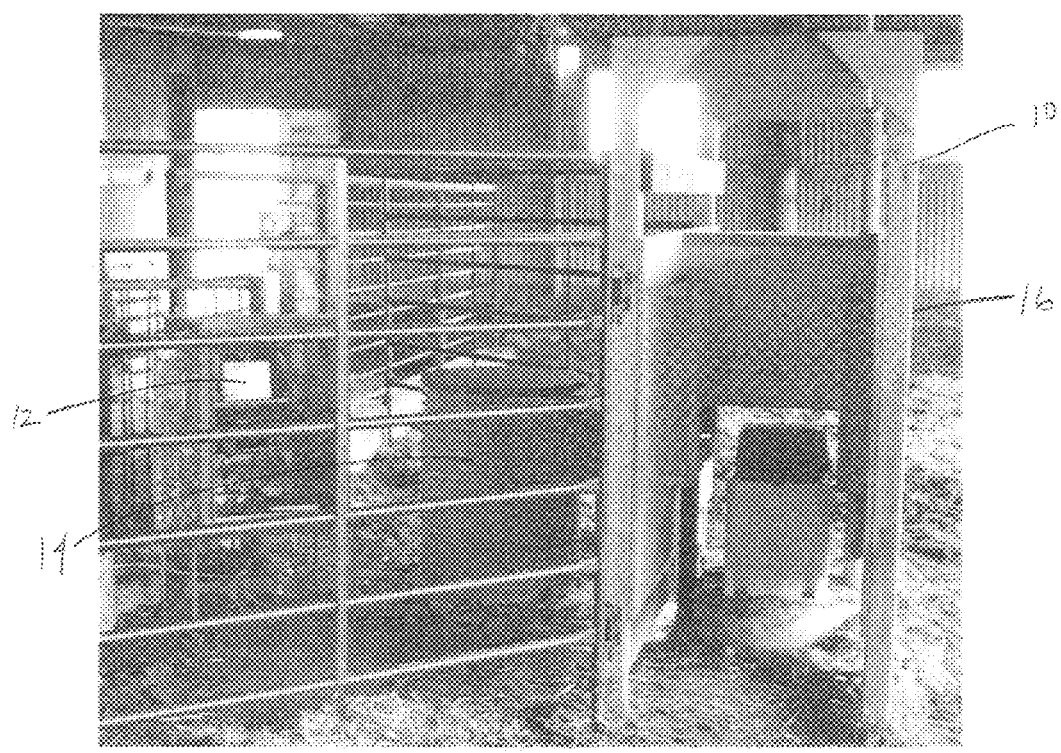

| | | | |
|---|---|---|---|
| 7,026,941 | B1 | 4/2006 | Anderson |
| 7,039,220 | B2 * | 5/2006 | Kriesel .................. G01B 11/25 382/110 |
| 2007/0093965 | A1 | 4/2007 | Harrison et al. |
| 2007/0186297 | A1 * | 8/2007 | Kerley .................. A01K 29/00 800/15 |
| 2010/0036277 | A1 | 2/2010 | Austin |

FOREIGN PATENT DOCUMENTS

| | | | |
|---|---|---|---|
| JP | 2006050989 A | 2/2006 | |
| WO | 2008001367 A1 | 1/2008 | |
| WO | 2008003139 A1 | 1/2008 | |
| WO | WO 2012129657 A1 * | 10/2012 | ........... A01K 29/005 |

OTHER PUBLICATIONS

Colak et al. "Early detection of mastitis using infrared thermography in dairy cows." Journal of Dairy Science, 2008, 91(11):4244-4248.

Cook and Schaefer. "Infrared Thermography and Disease Surveillance." in, Thermography, Current Status and Advances in Livestock Animals in Veterinary Medicine. Eds. Fabio Luzi, Malcolm Mitchell, Leonardo Nanni Costa, and Veronica Redaelli. Fondazione Iniziative Zooprofilattiche e Zootecniche Brescia 2013. ISBN 978-88-97562-06-1.

Cook et al. "Infrared Thermography of groups of pigs detects thermal responses to vaccination" Canadian Society of Animal Science and Canadian Meat Science Association Joint meeting 2013, Jun. 18-20, 2013.

Friendship et al. "Use of infrared thermography for early detection of disease causing sudden death in a swine finishing barn" pp. I27-I28 28th Annual Centralia Swine Research Update 2009. CentraliaSwineResearch.ca, Ontario.

Hovinen et al. "Detection of clinical mastitis with the help of a thermal camera." Journal of Dairy Science, 2008, 91(12):4592-4598.

Loughmiller et al. "Relationship between mean body surface temperature measured by use of infrared thermography and ambient temperature in clinically normal pigs and pigs inoculated with Actinobacillus pleuropneumoniae." American Journal of Veterinary Research, 2001, 62(5):676-681.

Loughmiller et al. "An evaluation of differences in mean body surface temperature with infrared thermography in growing pigs fed different dietary energy intake and concentration." Journal of Applied Animal Research, 2005, 28(2):73-80.

McCafferty. "The value of infrared thermography for research on mammals: Previous applications and future directions." Mammal Review, 2007, 37(3):207-223.

Schaefer et al. "The use of infrared thermography as an early indicator of bovine respiratory disease complex in calves." Research in Veterinary Science, 2007, 83:376-384.

Schaefer et al. "The non-invasive and automated detection of bovine respiratory disease onset in receiver calves using infrared thermography." Research in Veterinary Science, 2012, 93:928-935.

Schaefer et al. "Non-invasive detection of infectious laryngotracheitis (ILT) in poultry using infrared thermography." Canadian Journal of Animal Science, 2008, 88(1):138.

Schwartzkopf-Genswein and Stookey. "The use of infrared thermography to assess inflammation associated with hot-iron and freeze branding in cattle." Canadian Journal of Animal Science, 1997, 77(4):577-583.

Stewart et al. "Infrared Thermography as a non-invasive method for detecting fear-related responses of cattle to handling procedures." Animal Welfare (South Mimms, England) Oct. 2008; 17(4):387-393.

Thompson et al. "Predicting residual feed intake in beef bulls by measuring radiated heat loss through infrared thermography." Canadian Society of Animal Science and Canadian Meat Science Association Joint meeting 2013, Jun. 18-20, 2013.

* cited by examiner

FIGURE 4

|  | Highest RFI (inefficient) 1/3 Bulls | Lowest RFI (most efficient) 1/3 Bulls |
|---|---|---|
| RFI | 0.50 ± 0.24 (SD) | -0.52 ± 0.34 |
| IRT | 15.6 ± 2.8 C | 14.3 ± 2.1 C |

RAPID AND AUTOMATIC DETERMINATION OF METABOLIC EFFICIENCY IN LIVESTOCK

TECHNICAL FIELD

The use of non-invasive, rapid infrared thermography for the rapid determination of metabolic efficiency of farmed animals is provided. More specifically, the present apparatus and method relates to inducing animals into a non-steady biological states and utilizing infrared thermography information about the animal to determine its metabolic efficiency.

BACKGROUND

Many animal management events experienced by livestock throughout the animal's lifetime can influence its overall welfare, performance (e.g. the quality of food it produces), and the cost of agricultural resources required. For instance, exposure to handling and transport, co-mingling, auction and time off feed can cause stress in animals, impeding their immune system and increasing the incidence of disease. Left unmanaged, such events can have a considerable economic impact on the agricultural industry. The use of agricultural resources for the production of animal products is increasingly being scrutinised as human populations expand, increasing the need to mitigate carbon footprints and greenhouse gas emissions. Monitoring and controlling the impact animal management events can lead to improved animal welfare and quality, and to overall environmental benefits such as reduced carbon footprint and greenhouse gas emissions.

Effective animal management can depend upon the ability to rapidly and non-invasively determine when animals are in steady or non-steady states (e.g. disease state, reproductive states, or growth phases). Monitoring these biological states is important to the agricultural industry, as well as to zoo and wildlife biology settings because they can influence a plethora of biometric measurements and characteristics, such as an animal's metabolic efficiency.

Metabolic efficiency has become an important attribute in animal agriculture as competition for limited resources increases. Variation in inherent or normal growth efficiency among animals within a species can be large, at least in part due to genetic variation in feed conversion efficiency. Feed accounts for a large proportion of input costs required to raise livestock in all phases of production, so it is vital that producers get the most value for their feed. However, measuring an animal's metabolic efficiency has always been a challenge as many factors, including genetics, can dictate how feed affects the metabolic efficiencies of livestock.

Feed or growth efficiency is the measure of energy or feed resources required for a given gain in an identifiable animal product such as meat, milk or wool. Animals with poor feed efficiency not only grow less efficiently, but also produce more carbon dioxide and methane than higher feed efficiency animals, making it desirable for producers to be able to sort and select animals based on their feed efficiency. For example, in some animals, it is estimated that 70% of the food energy requirements used by an animal are actually spent on maintenance of the animal, not on growth or gain in an identifiable animal product such as meat, milk or wool. Further, animals with poor feed efficiency tend to produce more methane than the average animal because less of the ingested biomass is converted to energy, instead being converted to waste by-products such as methane. As such, the measurement of animal metabolic efficiency is a prime directive in animal agriculture, as the selection of only the most efficient animals by producers improves efficiency in the use feed resources.

Several techniques exist for classifying live animals into feed efficiency categories without predicting or measuring actual feed efficiency. Ultrasound can be used to score animals based on their body conditioning and frame size, however this approach merely selects larger body size, which is not a consistent indicator of feed efficiency. The "Kleiber ratio," which evaluates an animal's metabolic rate based on its mass, can be used but again only provides for the selection larger body size. Known methods fail to account for variation in growth efficiency based on the overall health or the genetics of the animal.

One of the more accurate methods for monitoring feed efficiency is to use indirect calorimetry which measures exactly the amount of oxygen and energy used by an animal for a given increase in gain of a specific tissue while noting that the metabolism will also give off heat. This method requires the use of expensive and complex indirect calorimetry equipment, the training of animals and the necessity to conduct trials at a physiological steady state.

A more recent approach to monitoring feed or growth efficiency is to monitor the residual feed intake (RFI) value, which partitions feed intake into that used for production and a residual portion reflecting efficiency. Fundamentally, this process compares the measured feed-to-gain against a known estimate for feed-to-gain, based on scientifically accepted formulas. While reasonably accurate, the RFI method requires a lengthy monitoring period of at least seventy days making it both expensive and impractical.

U.S. patent application Ser. No. 10/558,854 (Publication No. US2007/0093965 A1) filed by Harry Harrison et al. ("Harrison") teaches the use of infrared thermography (IRT) to determine or predict growth efficiency in animals. Infrared thermography is a known method of detecting the dissipation of heat from animals and operates on the principle that infrared radiation can be utilized to observe radiated heat loss and to provide an early indicator of fever because up to 60% of the heat loss from an animal occurs in infrared ranges. While IRT can be an effective in non-invasive identification of transport and other environmental stressors, the Harrison method requires that sufficient animals be sampled to over long periods of time (several weeks or months) to provide enough data to predict animal growth. As such, the method is not suitable for rapidly determining the metabolic efficiency of one animal at a time.

Further, the Harrison method requires that the animals be in a steady-state condition, meaning that the animal's endocrine, physiological and metabolic value are all within a normal range and the animal is not stressed. It is well known, however, that animals often do not display overt signs of illness or a non-steady state (that would be detectable by a caregiver) until later in the progression of the disease. As such, despite the Harrison method expressly attempting to exclude animals in a non-steady state, it is entirely possible that the collected values from many animals could be skewed as a result of inadvertently including animals having an abnormal thermal expression.

There is a need for a non-invasive means for identifying metabolic efficiency in livestock without requiring the animal to be in a steady-state condition, enabling producers to rapidly determine each animal's overall health and performance, and to predict its response to various animal management events (e.g. disease, stress, growth, reproduction). The method could provide for the ranking, selection, breeding and/or culling of animals based upon their efficiency, adding value to the herd and decreasing production and environmental costs.

SUMMARY

The use of infrared thermography (IRT) to predict metabolic efficiency in steady-state animals is known, but it was not until infrared thermography images were used in combination with behavioural "fidgeting" information about an animal that a correlation between an animal's metabolic efficiency in a non-steady state was observed, and that such information could be used to identify animals having a positive or negative residual feed intake. Due to the requirement that IRT information be taken from animal's having a normal range, non-steady state animals skew data and are expressly excluded from known IRT methods.

Using embodiments herein, the present apparatus and method may be used to determine an animal's metabolic efficiency when the animal is in a non-steady state. Animals are counterintuitively inducted into non-steady states before IRT information is collected and used to determine the animal's metabolic efficiency. The present apparatus and method enables a fast (e.g., less than 24 hours), effective and automatic way to rank, breed and/or cull animals, improving product quality, reducing operation costs, and minimizing greenhouse gas emissions.

In one embodiment, a method of determining metabolic efficiency of an animal is provided, the method comprising inducing the animal into a non-steady state, collecting infrared thermography information about the animal, and utilizing the information to determine the metabolic efficiency of the animal. Non-steady states may be induced via various means such as, for example, merely removing feed from the animal (e.g. instituting a postprandial period), introducing a disease (e.g. viral infection, bacterial infection, fungus, micoplasmid or mold), causing an increase in heat production (e.g. providing the animal with an energy bolus), or hormonally inducing a reproductive or estrus state. Using a predictive model, IRT images can be collected and rapidly analysed within 24-72 hours, and preferably in less than 24 hours, following the induction of the non-steady state.

In another embodiment, an apparatus for determining the metabolic efficiency of an animal induced into a non-steady biological state is provided, the apparatus comprising at least one infrared thermography camera for obtaining infrared information about the animal, and a processor in wired or wireless communication with the camera for receiving and processing information to determine the animal's metabolic efficiency using a predictive model. The apparatus further comprises animal identification means.

FIGURES

Figure 2:
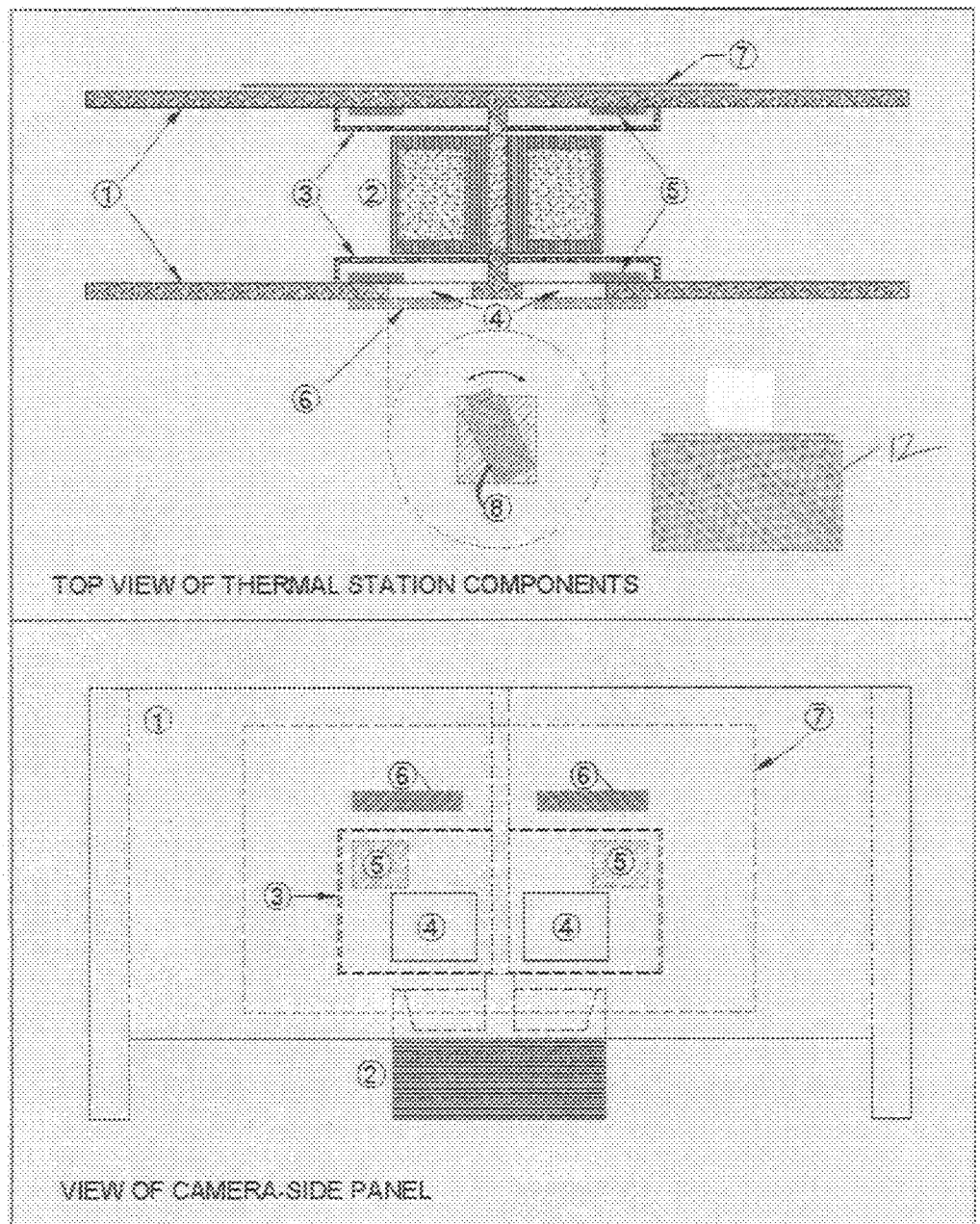
Figure 3:
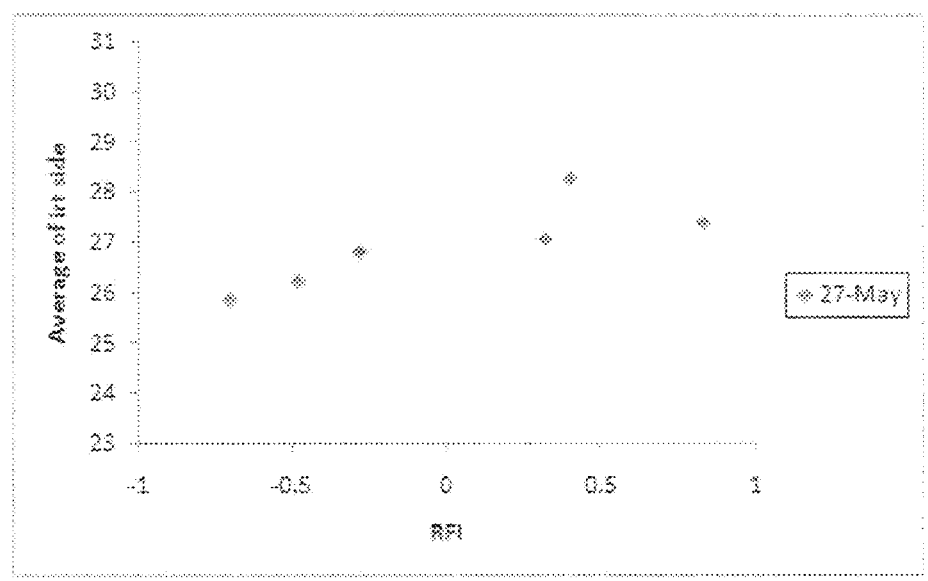

FIG. 1 depicts an embodiment of an apparatus for collecting infrared images about an animal according to embodiments described herein, FIG. 2 shows a top view schematic of an example embodiment of FIG. 1, FIG. 3 shows a graphical representation of infrared thermography information correlated against residual feed intake information, and FIG. 4 is a table showing the comparison of infrared thermography information and residual feed intake information for animals induced into a non-steady state via feed withdrawal.

DESCRIPTION OF EMBODIMENTS

Using embodiments described herein, an apparatus and method for the rapid detection of metabolic efficiency in animals is provided. It was discovered that the infrared thermography (IRT) information about an animal in a non-steady biological state correlated with the metabolic efficiency of that animal and could be used to identify animals having a positive or negative residual feed intake. Herein, animals are induced into non-steady biological states (e.g. postprandial, disease, increased heat production, reproduction or estrus), and non-invasive, real-time infrared thermography (IRT) images about the animal are collected and utilized to rapidly determine the animal's metabolic efficiency.

Non-steady states in animals can include conditions in which an animal's endocrine, physiological or metabolic values are in a state of flux (e.g. due to stress or growth phases), rather than a "steady" state where such values are in normal ranges. Non-steady states may be induced via any means such as, for example, withdrawing the animal's feed to institute a postprandial period, infecting the animal with a disease or illness, or causing the animal to increase its heat production (e.g. via an energy bolus). Using a predictive model, the animal's metabolic efficiency can be determined, enabling producers to rapidly rank, breed and/or cull animals, improving animal product quality and quantity, and reducing greenhouse gas emissions.

While the present disclosure generally relates to cattle, it is understood that other livestock animals, including farmed domestic ruminant and monogastric animals such as swine, horses, bison, sheep, deer, llama, elk, goats, ostrich, and poultry (e.g., chickens, turkeys, ducks, and geese can be used.

For the purposes of this specification, the terms "metabolic efficiency," "feed efficiency," "feed conversion efficiency," "growth efficiency" and grammatical variations thereof refer interchangeably to the efficiency of feed utilisation of an animal. In other words, these terms refer to the growth of the animal or unit of exported protein production, such as milk, per unit of resource or feed input. These terms can also refer to a unit of measuring the amount of feed (or energy) consumed per unit of growth of an animal, such as body weight, muscle mass or fat mass gain. The measurement of resource inputs are further defined to include or be represented by feed input such as grain or hay, feed component inputs such as carbon, nitrogen, calcium, phosphorus or other sources of energy. Infrared thermography may be utilized to measure energy loss in joules, providing a direct measure of energy use of an animal, rather than a calculated value such as reed required per gain.

Having regard to FIG. 1, according to embodiments herein, the present apparatus and method may comprise a receiving area 10 equipped with a multi-animal scanning apparatus comprising a processor 12, at least one camera 14 (shown in camera housing) and an enclosure 16 for receiving animals, the enclosure 16 being optionally equipped with animal identification means. Receiving area 10 may be any configuration designed for the receipt of one or more animals from one or more direction, provided that the at least one camera 14 is positioned to collect accurate infrared thermography images about the animals without having to restrain or reduce the animal's movement. For example, receiving area 10 may any pen or pasture with enclosure 16 being a water or food station, or any other such design that accomplishes the functions described herein. A water station may be preferred given that animal's in non-steady states, such as illness, cease eating due to loss of appetite before they cease drinking.

Having regard to FIG. 2, a top down view of an exemplary receiving area 10, having enclosure 16 positioned between two side panels 1, is shown. A two-water bowl float system 2 (e.g., Ritchie Cattle Fountains, Conrad Iowa, USA), positioned between optional panels 3 for centering/positioning the animal's head, can be accessed by the animal entering the enclosure 16. Optionally, viewing windows 4 may be provided for observing the animal.

Enclosure 16 may be equipped with animal identification means such that images taken from each unique animals can be distinguished (e.g. ear tags, RFID tags, pain or other markings, implanted tags, or the like). For example, FIG. 2 provides at least two in-phase loop antennae 5 mounted at or near the receiving area 10 for receiving digitally transmitted information from unique RFID tags on each animal. The antennae 5 may be connected to an RFID control module or reader 6 (e.g. Allfex PNL-OEM-MODLE-3) capable of transmitting radio frequency signals and reading said signals. Optional electromagnetic shielding means 7 may be provided to prevent the improper reading of RFID tags on animals that are not within the enclosure.

Enclosure 16 may further be equipped with at least one infrared thermography camera 8 for acquiring thermal images or videos about the animals. In embodiments contemplated herein, the cameras 8 may be capable of detecting radiation in the infrared range of the electromagnetic spectrum (roughly 5,000-15,000 nanometers or 5-15 µm) and producing images related thereto, called thermograms. Cameras 8 may be capable of obtaining at least 1-60 images/second (e.g. FLIR S60 broadband camera; FLIR Comp., Boston, Mass.). Cameras 8 may be capable of transmitting IRT information about the animal to processor 12 via wired or wireless. It is understood that multiple cameras 8 may be used to achieve greater accuracy (e.g. by collating more information to give a clearer result), and to provide sufficient information to minimize having to move or reposition the animal for accurate measurements. Cameras 8 may be manually or automatically operated (e.g. via motion sensor triggered by the animal). Cameras 8 may be hand held or mounted to the receiving area 10. Where mounted, any known mounting means for positioning and rotating (manually or automatically) the cameras 8 may be used. Rotating means may be automatic and comprise a geared-head motor connected to the camera 8 for powering rotation thereof.

Cameras 8 may be positioned to capture at least one IRT image about the animal from at least one view. Radiated temperature is known to be heat lost by an animal due to radiation as electromagnetic radiation (e.g. in most mammals, about 40-60% of the heat lost is due to radiated heat lost and much is in the infrared range). Any area providing an accurate thermal reading of radiated heat from an animal for use in determining non-steady states may be used. For example, images may be obtained from animals at or near a location providing an accurate radiated peripheral temperature reading about the animal such as a dorsal, lateral, distal, ventral, frontal, facial region, or combination thereof. In one embodiment, IRT images may be captured from the animal's orbital area (e.g. at the eye±1 cm surrounding the eye). Images taken from each region may or may not cover the entire animal surface from that view and an image may only include a portion of a given view. The images and thermal information derived therefrom may be stored after capture via any known electronic memory means.

Processor 12 may be operative to control camera positioning, the frequency and timing of infrared images taken for each animal, and for receiving, storing and processing the infrared images received from the camera 8. Instrument integration and the hardware and software used in embodiments herein was designed and developed, in part, at the Lacombe Research Centre, Lacombe, Alberta, Canada. Processor 12 may allow for the present system to be automatically monitored and controlled remotely, and may be capable of producing a final data report about each animal.

Processor 12 may further be operative to receive animal identification information corresponding to each image, to calculate a value of statistical measurement of temperature about the animal, and to utilize a predictive model to determine the metabolic efficiency about the animal. Image data may be analysed used known means, and the statistical measurement of temperature data for each IRT image may be a measure of central tendency such as the mean or average, mode or median. Statistical measures of dispersion may also have utility and would include, without limitation, the variance, range, standard deviation, coefficient of variation and standard error. Measurement may also be made of the calculation of nonparametric or rank scale values. Reference to the predictive model may be defined as any mathematical model that has high accuracy in predicting feed efficiency as units of tissue accumulation per unit of feed resource. Statistical measurements of temperature data for each image may be included as input variables. The animal metabolic or feed efficiency may be determined by the predictive model:

$$GE = \frac{ADG}{EFC} \times \frac{IRT}{W^{.75}}$$

where GE represents the metabolic or growth efficiency, ADG represents the average daily grain intake of the animal, EFC represents the estimated feed consumption, IRT represents the infrared thermographic value and W represents the body weight of the animal. The predictive model may be developed from a sample population of animals of the same species and of sufficient numbers that enable statistically significant comparison. Such a sample size may contain as few as three but preferably greater than 100 animals. Any one or more of the following factors may be used in the predictive model: body weight, compositional data, or feed consumption. Use of the image data in the predictive model may be through any known statistical techniques to determine the relationship between the input and output variable including multiple linear regression, cluster analysis, discriminate analysis, curve fitting, ranking, and artificial neural network learning.

The GE may be measured indirectly by reference to the residual feed intake or "RFI." The RFI for a group of animals may range from –2.0 to +2.0 depending on the animal feed efficiency where 0.0 represents a predicted feed efficiency. RFI numbers greater than this (+) represent poor efficiency animals requiring more food than predicted and/or converting that food to waste energy such as heat. RFI numbers lower than this (–) represent higher feed efficiencies where less food may be required or where the animal is better able to convert the feed to energy. The RFI may range from –1.5 to +1.5.

It is an advantage of the present non-invasive method that measurements taken from animals in induced non-steady biological states can be done with minimal confounding factors such as human touching, movement or startling of the animal. Each of these factors are known to cause an elevation in temperature, impacting the animal's feed efficiency, measurements taken about the animal, and accuracy of results. It is understood that the present method may be used alone or in combination with other measurement methods such as body weight, compositional data or feed consumption.

It should be understood that animals having a higher metabolic feed efficiency tend to produce fewer by-products, and instead produce more energy than is captured for growth and therefore tend to be fitter, stronger and healthier animals. This in turn leads to better quality meat, milk, and/or fibre product from the higher efficiency animals.

It is contemplated that the present apparatus and method may be used in the genetic selection of animals, which can be useful for animal producers breeding stock animals, dairy cattle and show animals. For instance, animals determined to have a negative metabolic efficiency (negative residual feed intake) may be culled, removed from breeding pens, or combinations thereof, whereas animal found to have a positive metabolic efficiency can be selected for future breeding, having genetic material removed and used to produce transgenic animals with increased RFI, selected for and used for producing wool or other animal derived fibre, for racing, for breeding stock and show, to reduce greenhouse gas emissions, or combinations thereof.

It is contemplated that one advantage of the present apparatus and method may be the ability to increase the feed efficiency of an animal group by first determining the metabolic efficiency of animals in the group and selectively breeding animals having a high metabolic efficiency with each other and/or culling animals in the group with a low feed efficiency. Animals having similar feeding efficiencies can also be grouped together with growth finishing diets tailored to the measured growth efficiency of the animal group. Further, the feed efficiency information may be used to develop or test diet efficiency for a given group of metabolically similar animals, that is—to determine which specific types of resource inputs (diet types) result in the greatest efficiency of growth.

It is contemplated that another advantage of the present apparatus and method may be the ability to increase the quality and/or quantity of animal derived products in an animal group by the first determining the metabolic efficiency of animals in the group and selectively breeding animals having a high metabolic efficiency with each other and/or culling animals in the group with a low feed efficiency.

It is known that animals with poor metabolic efficiency convert more feed into waste products than energy. It is contemplated that another advantage of the present apparatus and method may be the ability to decrease the greenhouse gas emitted from animals in a non-steady state in a group by first determining the metabolic efficiency of the animals in the group and selectively breeding animals having a high metabolic efficiency with each other and/or culling animals in the group with a low feed efficiency, increasing the group efficiency and decreasing greenhouse gas emissions from the animal group.

It is contemplated that another advantage of the present apparatus and method may be the ability to utilize radiated temperature information to evaluate causes of heat loss not necessarily related to animal growth (e.g. non-steady state heat production arising from physiological stress and the catabolism of tissue, shivering thermogenesis, disease and infection, and the presence of tumours)

It is contemplated that another advantage of the present apparatus and method may be the ability to group or pen animals having similar metabolic efficiencies together, producing animals having similar growth patterns, which can be expressed by a lower degree of variation in animal traits (e.g. carcass yield, efficiency of diet utilization). Grouping and selecting animals could result in the production of animal product having more consistent quality, production volumes (milk), fibre growth and fibre characteristics (wool) and other characteristics.

Generally, the present apparatus and method aim to provide means for determining the metabolic efficiency of an animal via a non-invasive, time-efficient and comparatively inexpensive method, which enables the selection and grouping of the most efficient animals for optimizing resource usage and reducing greenhouse gas production.

The following examples are provided to aid the understanding of the present disclosure, the true scope of which is set forth in the claims. It is understood that modifications can be made in the system and methods set forth without departing from the spirit or scope of the same, as defined herein.

EXAMPLES

Example 1—Metabolic Efficiency Ranking Under Non-Steady State Conditions Induced by Feed Withdrawal Sixty yearling bulls averaging 500 kg body weight of British or Continental breeding and fed ad libitum a cereal grain silage diet which met NRC feeding recommendations (NRC 1996) were used. Bulls were monitored for feed intake for the previous one hundred days using an automated feed weight measuring system (Growsafe®, Airdrie, Alberta). Using the feed intake data and knowledge of weight gain, the residual feed intake values (RFI) representing the actual feed required per unit of weight gain displayed by an animal compared to the predicted amount of feed required per gain was calculated using known methods. Animals displaying a greater growth efficiency will have lower RFI values compared to animals with lower growth efficiency. For example, an RFI value of −1 represents an animal consuming 1 kg of feed less per day for the same body weight gain than would be predicted. Likewise, an animal displaying an RFI value of 1 represents a heifer consuming 1 kg of feed per day more for the same body weight gain than would be predicted.

Following the feeding trial used to evaluate the RFI values, the bulls were removed and held off feed for approximately 18 h (i.e. postprandial period of 18 hours) with free access to water and a wood shavings area to lay on. This process and period of feed restriction constituted a moderate nutritional challenge to the animals.

After the postprandial period of feed restriction, infrared thermographs were taken of the bulls using a hand held FLIR S60 broad range camera. Care was taken to fix the focal distances and angles for the images. Radiated temperatures were calculated using known procedures, and values were collected for many anatomical views (including the cheek) representing approximately a 5 cm×5 cm area over the mandible.

RFI values between −1.4 to +0.9 were observed, representing a typical variation in metabolic efficiency in cattle of this type. Animals displaying greatest efficiency also displayed the lowest baseline radiated temperature, while animals with the highest RFI values displayed the highest radiated temperatures. Having regard to FIG. 4, when the initial or baseline values for radiated temperature were ranked using all animals with the RFI values there was a significant (P<0.05) relationship between RFI and radiated temperature.

There are many factors that determine or influence growth efficiency in an animal. Of these factors, thermoregulation and protein synthesis, and heat production are known to have a significant influence. FIG. 4 demonstrates that managing heat production, as evident by the reduced radiated energy loss in the infrared spectrum in more efficient animals, is one biological strategy that can be used to control or retain growth efficiency advantages under periods of adversity such as nutritional insufficiency.

By monitoring the radiated heat loss in animals under a moderate dietary challenge or non-steady state it appears that this relationship or variation in growth efficiency can be revealed. The results may be used to stratify the grouping of animals into greater and lesser efficient groups to more effectively take advantage of these traits through culling inefficient animals and/or breeding more efficient animals. For example, animals can be stratified into quartile groups whereby the third top most efficient animals (low RFI and low IRT) could be separated from the lowest third most efficient animals (high RFI and high IRT). The most efficient animals could be used for herd selection and the least efficient animals culled. This stratification could also be used to direct animals to different feeding regimes.

Example 2—Growth Efficiency Ranking Under Non-Steady State Conditions Induced by a Disease State Fifteen Hereford X Angus crossbred seven month old heifers having an average 189 kg live weight were maintained on a balanced cubed alfalfa hay based diet which provided 1.5 times the calculated maintenance diet level for these animals. The heifers were housed in groups of five animals in three separate rooms within a bio-containment facility kept at thermo-neutral temperature and humidity. Ad libitum fresh water and rubber mats for bedding were provided for all animals.

In this case, differences in growth efficiency were determined by inducing into a non-steady disease state. For example, the non-steady disease state comprised introducing the animals to a viral disease or more specifically, Bovine Viral Diarrhea or "BVD". The animals were thus placed into a condition of non-steady state via a disease induction model. Briefly, the present disease induction model involved the introduction of live virus particles to the treatment animals (n=10) via a nasal gavage. Control heifers received a sham gavage with saline. Body weight was monitored on all animals before and after. Radiated temperatures were monitored on the animals using an Inframetrics broad band 740 camera (Inframetrics Comp.). Infrared images from multiple views of the calves were taken with focal distances and angles standardized.

During the infective stage of the trial the orbital (eye plus surrounding 1 cm of skin) maximum radiated temperatures for the BVD infected calves displayed an increased change in temperature or delta T of 2.43° C. Changes were apparent within 24-78 hours, and preferably within 24 hours of the infective stage. Control or non-infected calves did not display a change in orbital temperatures. Infected calves displayed a lower weight change average of 0.3 kg/day increase in body weight compared to an average of 0.54 kg/d weight gain for the control calves (P=0.046 one tail unequal variance least squares analysis).

Calves displaying the lowest weight gain had the highest radiated orbital temperature. The calves were all provided the same quality and quantity of diet and with the exception of the peak days of infection, consumed similar amounts of feed. As such, the growth efficiency was lower in the animals displaying a higher temperature or conversely, greater growth efficiency was seen in animals with a lower radiated temperature under the conditions of non-steady state induced by viral model.

Example 3—Growth Efficiency Ranking Under Non-Steady State Conditions Induced by Increasing Heat Production In this example, an increase in heat production (non-steady state) was induced via providing an energy bolus or providing the animal with feed. It is well established that the consumption of food will result in what is referred to as a heat increment of feeding. This is due to a host of factors and when an animal is experiencing this heat increment they are considered to be in a non-steady physiological state. An animal that is more efficient will retain more of the gross energy from a meal loosing less of that energy to the environment. That difference should display itself as a lower post meal radiated temperature in more efficient animals. It is understood that other means for increasing heat production in animals could be used.

Following the measurement of base line radiated measurements, heifers were offered 2.5 kg of rolled barley while contained in their individual pens. It was anticipated that the animals would consume their meal quite quickly since they had been off feed or in a postprandial period for some time (approximately 18 h). The animals were then followed for some 6 h collecting infrared radiated images at scheduled times. It was observed that two of the heifers consumed 96-100% of their diet. These animals also were known to have some significant difference in their growth efficiency with difference in RFI as measured in Example 1. These two heifers were followed and measured via IRT for another four hours collecting infrared images every 20-30 minutes.

Consistent with the results of Example 1, the efficient animal (RFI –0.7) was seen to display firstly a lower baseline cheek temperature (24.7° C.) compared to the lesser efficient animal (RFI 0.83) showing a baseline cheek temperature of 26.5° C. Also, for these two animals, the more efficient animal (RFI –0.07) displayed a change in temperature (delta T) over the four hours of 2.3° C. on the cheek image compared to a higher delta T of 2.8° C. for the less efficient animal.

More efficient animals appear to display a lower post meal radiated temperature reflecting a greater retention of energy, enabling the present method to be used for measuring metabolic efficiency in non-steady state animals.

These examples aim to illustrate several types of non-steady state models whereby animals displaying greater growth efficiency also display a lower baseline radiated thermal value and a lower delta T value when exposed to a stressful situation. It is understood that the present models may be utilized in any farmed livestock animals, and that any means for effectively inducing animals into a non-steady state may be considered.

Aspects of IRT measurement and use of this technique in respect of evaluating animal feed efficiency have been described by way of example only and it should be appreciated that modifications and additions may be made thereto without departing from the scope of the claims herein. The scope of the claims should not be limited by the preferred embodiments set forth in the examples, but should be given the broadest interpretation consistent with the description as a whole.

What is claimed is:

1. An automated method of rapidly detecting thermal responses in an animal induced into a non-steady state, the method comprising:
providing a processor operative to:
identify the animal, wherein the identifying includes receiving, at the processor, signals generated by an electronic tag attached to the animal, and wherein the signals comprise animal identification information, and
obtain growth information about the animal, wherein the obtaining includes:
receiving, at the processor, feed intake signals and weight gain information about the animal, the feed intake signals and the weight gain information each generated by an automated feed weight system, and
comparing, via the processor, the feed intake signals and weight gain information to predicted growth information about the animal,
inducing the animal into the non-steady state, the induction of the non-steady state being a state selected from a postprandial state, a disease state, an increased heat production state, or estrus or reproductive states,
obtaining, at the processor, infrared thermography information about the animal, wherein the obtaining the infrared thermography information includes providing at least one infrared thermography camera to automatically obtain infrared thermography images about the animal, and
processing, via the processor, the animal identification information, the growth information, and the infrared thermography information about the animal to detect a thermal response in the animal, wherein the thermal response of the animal is indicative of the animal's metabolic efficiency,
and, based upon the detected metabolic efficiency of the animal, ranking the animals for selective breeding or culling of the animal.

2. The method of claim 1, wherein the postprandial state is induced by feed withdrawal.

3. The method of claim 1, wherein the disease state is induced by infecting the animals with a disease.

4. The method of claim 3, wherein the disease is selected from a virus, bacteria, fungus, micoplasm, or mold.

5. The method of claim 3, wherein the viral disease state is Bovine Viral Diarrhea.

6. The method of claim 1, wherein the increased heat production state is induced by providing feed to the animal.

7. The method of claim 1, wherein the increased heat production state is induced by providing an energy bolus to the animal.

8. The method of claim 1, wherein metabolic efficiency is determined in approximately 24-72 hours.

9. The method of claim 1, wherein the metabolic efficiency is determined in 24-48 hours.

10. The method of claim 1, wherein the metabolic efficiency is determined in or less than 24 hours.

11. The method of claim 1, wherein a predictive model is utilized to determine the metabolic efficiency.

12. The method of claim 1, wherein, when the animal is metabolically efficient, the animal may be selected for breeding and, where the animal is metabolically inefficient, the animal may be removed from breeding pens or culled.

13. An automated apparatus for rapidly detecting thermal responses in an animal induced into a non-steady biological state, the apparatus comprising:
at least one automated feed weight system for monitoring feed intake and weight gain information about the animal, for comparison to predicted growth information about the animal to generate growth information about the animal,
at least one infrared thermography camera for photographing infrared thermography images of the animal in the non-steady state to obtain infrared thermography information about the animal, wherein the induction of the non-steady state is selected from a postprandial state, a disease state, an increased heat production state, or estrus or reproductive states and
a processor, operatively connected to the at least one feed weight system and the at least one infrared thermography camera, for receiving and processing the infrared thermography information and the growth information to determine the thermal response in the animal, wherein the thermal response is indicative of the animal's metabolic efficiency and, according to the metabolic efficiency detected, to selectively rank the animal for breeding or culling of the animal.

14. The apparatus of claim 13, further comprising animal identification means operatively connected to the processor, wherein the animal identification means generates signals comprising animal identification information to the processor.

15. The apparatus of claim 14, wherein animal identification means comprise radio-frequency identification tags on the animal.

16. The apparatus of claim 13, wherein the processor is operative to automatically utilize the thermal response of the animal to determine metabolic efficiency using a predictive model.

17. The apparatus of claim 16, wherein the processor is operative to automatically rank the animal according to its metabolic efficiency.

18. The apparatus of claim 13, wherein the apparatus is positioned at or near a receiving area accessed by the animal.

19. The apparatus of claim 18, wherein the at least one infrared thermography camera is rotatably mounted to the receiving area accessed by the animal.

20. The apparatus of claim 13, wherein the apparatus is remotely monitored.

21. The apparatus of claim 13, wherein the processor communicates with the camera and animal identification means via wired or wireless connection.

* * * * *

UNITED STATES PATENT AND TRADEMARK OFFICE
CERTIFICATE OF CORRECTION

PATENT NO. : 9,961,883 B2
APPLICATION NO. : 14/306005
DATED : May 8, 2018
INVENTOR(S) : Allan Schaefer et al.

It is certified that error appears in the above-identified patent and that said Letters Patent is hereby corrected as shown below:

On the Title Page

The Applicants and Inventors are named as:
Allan Schaefer, Lacombe (CA);
Kim Ominski, Winnipeg (CA); and
Sean Thompson, Winnipeg (CA);

And should be changed to:
Allan Schaefer, Lacombe (CA);
Kim Ominski, Winnipeg (CA);
Sean Thompson, Winnipeg (CA); and
Gary Crow, Winnipeg (CA).

Signed and Sealed this
Twenty-sixth Day of December, 2023

Katherine Kelly Vidal
*Director of the United States Patent and Trademark Office*